(12) United States Patent
Biskup

(10) Patent No.: US 9,707,854 B2
(45) Date of Patent: Jul. 18, 2017

(54) SERIES BOOSTER PACK FOR BATTERY SYSTEM CAPACITY RECOVERY

(71) Applicant: Atieva, Inc., Redwood City, CA (US)

(72) Inventor: Richard J. Biskup, Redwood City, CA (US)

(73) Assignee: Atieva, Inc., Menlo Park, CA (US)

( * ) Notice: Subject to any disclaimer, the term of this patent is extended or adjusted under 35 U.S.C. 154(b) by 879 days.

(21) Appl. No.: 13/920,224

(22) Filed: Jun. 18, 2013

(65) Prior Publication Data

US 2015/0061381 A1 Mar. 5, 2015

(51) Int. Cl.
*H02J 7/00* (2006.01)
*B60L 11/18* (2006.01)
(Continued)

(52) U.S. Cl.
CPC ......... *B60L 11/1851* (2013.01); *B60L 3/0046* (2013.01); *B60L 11/1805* (2013.01); *B60L 11/1857* (2013.01); *B60L 11/1862* (2013.01); *B60L 11/1864* (2013.01); *B60L 11/1868* (2013.01); *B60L 11/1874* (2013.01); *B60L 11/1877* (2013.01); *B60L 11/1879* (2013.01); *H01M 2/1077* (2013.01); *H01M 2/1083* (2013.01); *H01M 10/425* (2013.01); *H02J 7/0013* (2013.01); *H02J 7/0022* (2013.01); *B60L 2210/10* (2013.01); *B60L 2240/545* (2013.01); *B60L 2240/547* (2013.01);
(Continued)

(58) Field of Classification Search
CPC .............. B60L 11/1851; B60L 11/1868; B60L 11/1879; B60L 3/0046; B60L 11/1857; B60L 11/1862; B60L 11/1864; B60L 11/1874; B60L 11/187; H02J 7/0022; H02J 7/0013; H01M 10/425; H01M 2/1077; H01M 2/1083
USPC ........................................................ 320/103
See application file for complete search history.

(56) References Cited

U.S. PATENT DOCUMENTS

| | | | |
|---|---|---|---|
| 6,586,940 B2 * | 7/2003 | Asakura | H02M 3/07 324/426 |
| 6,932,174 B2 * | 8/2005 | Hirata | B60L 11/1851 180/65.245 |

(Continued)

FOREIGN PATENT DOCUMENTS

| | | |
|---|---|---|
| JP | 0914007 | 5/1997 |
| JP | 2004262357 | 9/2004 |
| JP | 2011211858 | 10/2011 |

OTHER PUBLICATIONS

Notification of Transmittal of the International Search Report and the Written Opinion of the International Searching Authority, PCT/US2014/042350, mailed Oct. 22, 2014.

*Primary Examiner* — Jack Chiang
*Assistant Examiner* — Brandon Bowers
(74) *Attorney, Agent, or Firm* — Womble Carlyle Sandridge & Rice LLP

(57) ABSTRACT

A battery system is provided. The battery system includes a base battery pack and a container having the base battery pack therein. The container is configured to receive a boost battery pack, wherein the container can hold the base battery pack and the boost battery pack. The battery system includes a coupling operable to provide electric power from the base battery pack alone or from the base battery pack in combination with the boost battery pack. A method of cooperating a battery pack is included.

19 Claims, 5 Drawing Sheets

(51) Int. Cl.
  *B60L 3/00* (2006.01)
  *H01M 2/10* (2006.01)
  *H01M 10/42* (2006.01)

(52) U.S. Cl.
  CPC ............ *B60L 2240/549* (2013.01); *H01M 2010/4271* (2013.01); *H01M 2220/20* (2013.01); *Y02T 10/7005* (2013.01); *Y02T 10/7044* (2013.01); *Y02T 10/7055* (2013.01); *Y02T 10/7061* (2013.01); *Y02T 10/7066* (2013.01); *Y02T 10/7216* (2013.01)

(56) References Cited

U.S. PATENT DOCUMENTS

| | | | |
|---|---|---|---|
| 8,552,686 B2 | 10/2013 | Jung et al. | |
| 2005/0269995 A1* | 12/2005 | Donnelly | B60L 3/0046 320/150 |
| 2010/0324846 A1* | 12/2010 | Marsh | G01R 31/3679 702/63 |
| 2011/0258126 A1* | 10/2011 | Patil | G06Q 30/012 705/302 |
| 2013/0020139 A1 | 1/2013 | Kim et al. | |
| 2013/0113424 A1* | 5/2013 | Froelich | H02J 7/00 320/109 |
| 2014/0032102 A1* | 1/2014 | Egoshi | G01C 21/3469 701/454 |
| 2014/0055094 A1* | 2/2014 | Takagi | H02J 7/0054 320/118 |
| 2014/0227568 A1* | 8/2014 | Hermann | H01M 10/5022 429/62 |
| 2015/0056475 A1* | 2/2015 | Adrian | H01M 10/4257 429/7 |
| 2015/0160304 A1* | 6/2015 | Nam | G01R 31/3679 702/63 |

\* cited by examiner

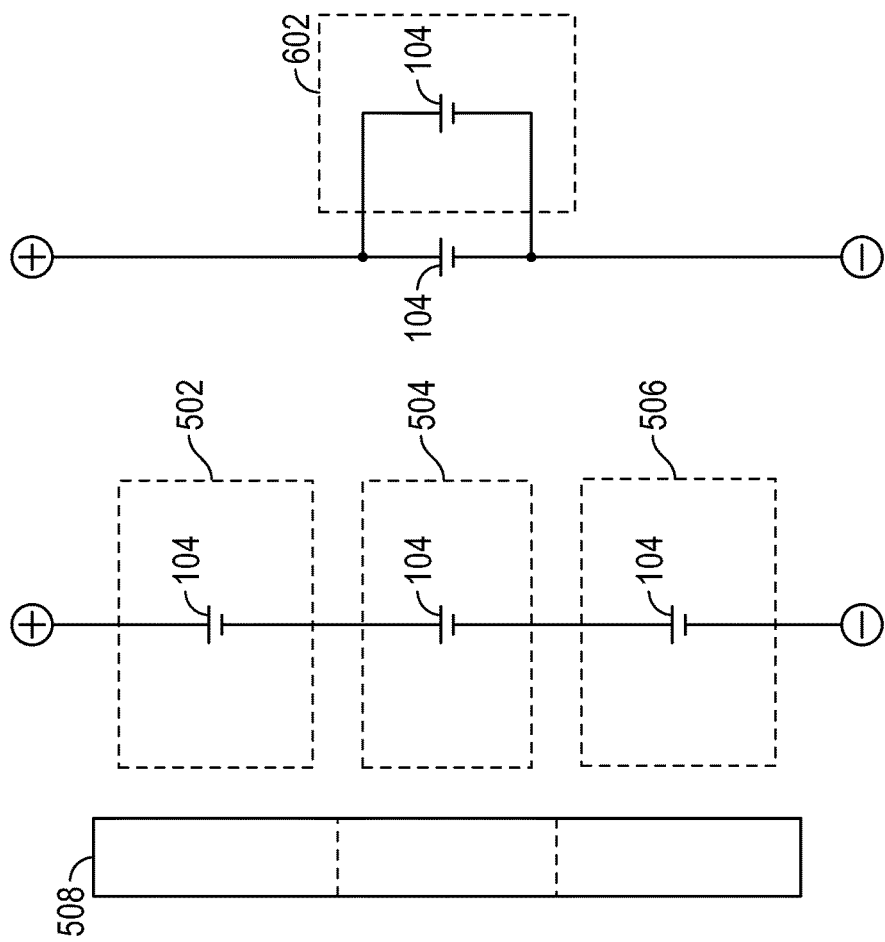
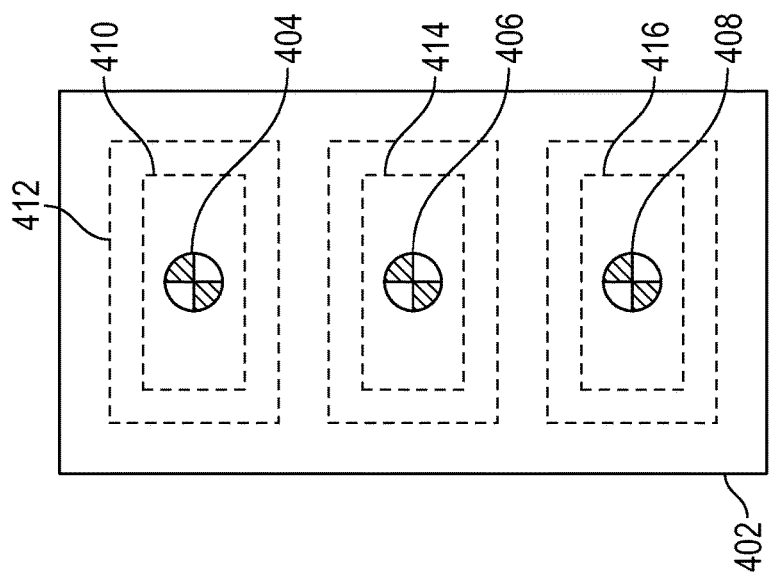

SERIES BOOSTER PACK FOR BATTERY SYSTEM CAPACITY RECOVERY

BACKGROUND

Rechargeable battery systems lose capacity over time due to aging of the individual cells of a battery pack. As the cells age, and through many cycles of charging and discharging the battery pack, the number of amp-hours that the battery pack can store gradually decreases. At some point in the lifetime of a system, the system will no longer be able to provide its intended function. Temperature of operation of the cells, and the charging rate of the cells are among the factors that affect the aging of the cells and attendant loss of capacity. For example, a new electric vehicle may originally provide a 60 mile range, and, the owner may require the vehicle to travel 48 miles per charge. When the vehicle's battery system has degraded to the point of not being able to provide 48 miles of travel prior to having to be recharged, the vehicle becomes useless to the owner. The owner may have to decide between replacing the aged battery pack, at great expense, and selling the vehicle in order to purchase a new one.

It is within this context that the embodiments arise.

SUMMARY

In some embodiments, a battery system is provided. The battery system includes a base battery pack and a container having the base battery pack therein. The container is configured to receive a boost battery pack, wherein the container can hold the base battery pack and the boost battery pack. The battery system includes a coupling operable to provide electric power from the base battery pack alone or from the base battery pack in combination with the boost battery pack.

In some embodiments, a battery system for use in an electric or hybrid vehicle is provided. The battery system includes a container having a negative terminal and a positive terminal. A base battery pack is installed in the container. The container and the base battery pack are dimensioned to receive a boost battery pack. The system includes a configurable coupling operable to couple the base battery pack to the negative terminal and the positive terminal. The configurable coupling is further operable to couple the boost battery pack and the base battery pack in combination to the negative terminal and the positive terminal.

In some embodiments, a method of operating a battery system is provided. The method includes providing a first electrical power from a base battery pack to an electric or hybrid vehicle, where the first electrical power is sufficient to propel the electric or hybrid vehicle to a first distance range. The method includes detecting a degradation of the base battery pack, the degradation causing the first distance range to drop below a threshold value. The method includes adding a boost battery pack to the base battery pack responsive to the detecting. The method includes providing a second electrical power from the base battery pack and the boost battery pack to the electric or hybrid vehicle, where the second electrical power sufficient to propel the electric or hybrid vehicle to a second distance range that is greater than the threshold value.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a schematic diagram of a container for use in the battery system of FIGS. 2 and 3, in accordance with some embodiments of the invention.

FIG. 5 is a schematic diagram of a series electrical coupling of the boost battery pack and the base battery pack of FIG. 3 in accordance with some embodiments of the invention.

FIG. 6 is a schematic diagram of a parallel electrical coupling of the boost battery pack and the base battery pack of FIG. 3 in accordance with some embodiments of the invention.

DETAILED DESCRIPTION

Figure 1:
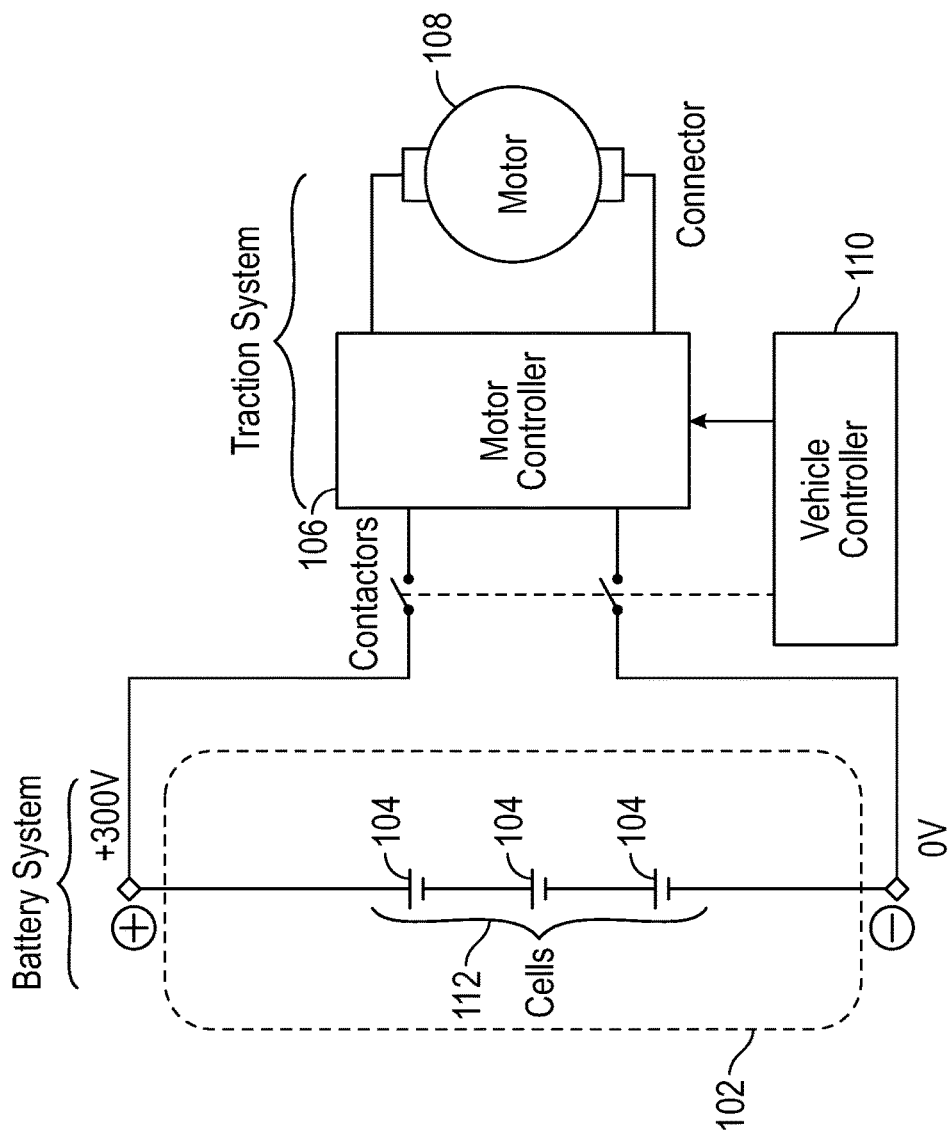
FIG. 1 is a schematic diagram of a battery system in an electric vehicle in accordance with some embodiments of the invention.

A rechargeable battery system, for use in an electric or hybrid vehicle, is herein described. The battery system has a base battery pack, and space for a boost battery pack to be added or combined with the base battery pack. Addition of the boost battery pack restores range of the hybrid or electric vehicle, or adds performance to the vehicle in some embodiments. The boost battery pack can be added when the base battery pack degrades, or the boost battery pack can be added as an upgrade. The battery system could also be used in other applications of battery storage such as uninterruptible power supplies or energy storage for solar power systems as the embodiments disclosed below are not meant to be limiting. In addition, the electric or hybrid vehicle mentioned herein may be a land based, sea/water based, or an air based vehicle.

In various embodiments, a battery system is designed with a base battery pack, and space is reserved for the installation of a second "boost" battery pack at a later time. During the early life of the battery system, the hybrid or electric vehicle operates off of the base battery pack alone. In some embodiments, a vehicle motor controller is designed to accept a wide range of voltages on its input while delivering power to the motor. Since the motor controller is a power converter and Power is the product of Voltage and Current (measured as amperage), then for a given level of Power, Voltage and Current are inversely related. When the vehicle no longer provides the required range, the boost battery pack is added to the system. The boost battery bay is arranged to connect the boost battery in series with the base battery pack, in some embodiments. With the boost battery pack installed in series, the total system voltage is increased and consequently the system requires less current to deliver the same power to the motor. Since the base battery pack now "sees" less current going out, the base battery pack drains at a lower rate, thereby extending system range. As a practical example for illustrating this concept (ignoring system losses), suppose a system includes a base battery pack of 300 volts (V) and a capacity of 100 amp-hours (Ah). This system can supply 30 kW (kilowatts) to a load for a period of 1 hour, (i.e., 100 Ah/[30,000 W/300V]=1 h). This load could represent a luxury car traveling down the road at 60 MPH (miles per hour) for 1 hour, covering a total distance of 60 miles.

It should be appreciated that as the base battery ages, the amp-hour capacity of the battery could be reduced to 80 Ah for example, representing a 20% loss of capacity. Since the above range calculation is linear, the aged vehicle (or, the vehicle with the aged battery) now has a range of 48 miles. Adding a boost pack of 100 volts, 100 Ah yields an overall system voltage of 400 volts. Under these conditions, the motor controller will draw 75 amps (A) instead of the original 100 amps to deliver the same 30 kW of power. At this rate the base battery will discharge in 80 Ah/75 A, or 1.06 hours. Using this approach, the original vehicle driving range is restored. Generally, the cost of a battery pack is dominated by the cost of the cells, so the cost to recover this range is approximately 100/300, or one third of the original battery system cost.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

For comparison purposes, FIG. 1 shows a battery system in an electric or hybrid vehicle, without provision for a battery boost pack. The battery system has multiple cells 104 in a battery pack 112, and the cells 104 are in a container 102. Many electric or hybrid vehicles have a battery pack mounted low in the chassis, such as beneath the passenger floor, in order to have a low center of gravity of the vehicle. The container 102 could be made of metal, plastic, or another suitable material and have air cooling or liquid cooling, for example. In this example, the battery system has a voltage of 300 volts, which is symbolized by showing three cells 104, with each having 100 volts. It should be appreciated that battery packs in electric or hybrid vehicles typically have a large number of cells in series and parallel. A motor controller 106 receives electric power from the cells 104, i.e., from the battery system, and delivers electric power to the electric motor 108. The battery system connects to the motor controller through contactors or other couplings as readily devised. A vehicle controller 110 operates electrical accessories, for instance an air conditioner, vehicle lighting, etc. In the embodiment shown, the vehicle controller can open or close the contactors to couple or decouple the battery system to the motor controller 106.

Still referring to FIG. 1, a fully charged battery pack 112 has a measurable capacity, often specified as amp-hours of electric current delivered at a specified voltage, which the battery pack 112 can deliver to the electric vehicle. The voltage drops gradually as the battery pack 112 discharges, and then drops more rapidly at the end of the discharge cycle. As the battery pack 112 ages, the capacity of the battery pack 112 decreases and the fully charged battery pack 112 can deliver a lesser number of amp-hours of electric current in a discharge cycle. The degraded battery pack 112 may still be reliable however the range of the vehicle is similarly degraded. In order to restore the range of the vehicle, the entire battery pack 112 with all of the cells 104, is removed and replaced with a new battery pack 112 that has new cells 104.

Figure 2:
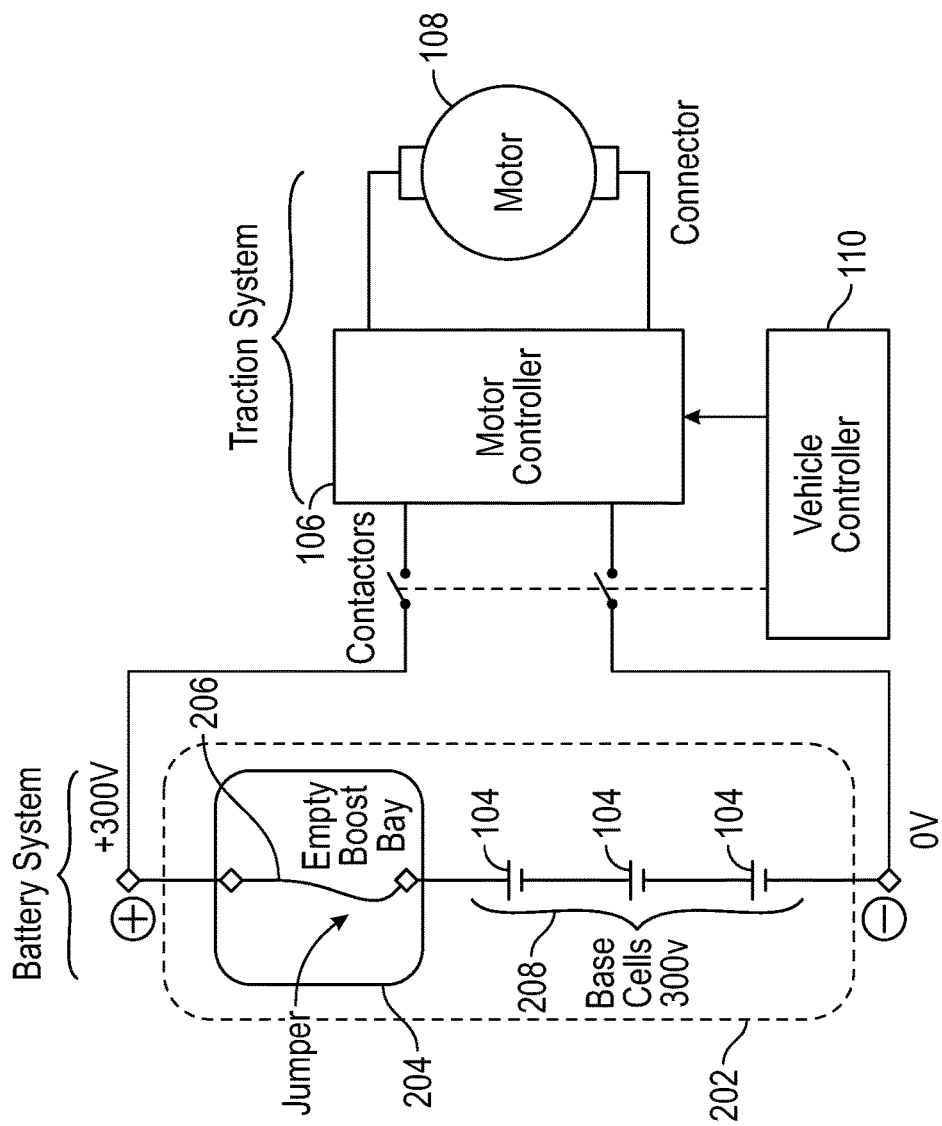
FIG. 2 is a schematic diagram of a battery system with a base battery pack and an empty boost bay, in an electric vehicle, in accordance with some embodiments of the invention.

FIG. 2 shows a battery system that allows the range of an electric or hybrid vehicle to be restored, through addition of a boost battery pack. Alternatively, as an upgrade, the boost battery pack could be added to increase range or increase maximum power, in the case where the base battery pack has not degraded. A base battery pack 208 has the same number of cells 104 as the battery system shown in FIG. 1. In the embodiment shown in FIG. 2, the vehicle controller 110 and the traction system, including the motor controller 106 and the electric motor 108, are similar to the components shown in FIG. 1, except for voltage margin as discussed further below. The base battery pack 208 is in a container 202. The container 202, with the base battery pack 208 inside, is mounted in the electric or hybrid vehicle. The container has a boost bay 204, which has space or capacity for a boost battery pack as will be discussed regarding FIG. 3. In some embodiments, the motor controller 106 of the electric or hybrid vehicle has sufficient voltage margin to operate with the voltage of the base battery pack 208 alone, and to operate with the voltage of the base battery pack in series with an added boost battery pack.

Continuing with FIG. 2, in this embodiment a jumper 206 is wired across the empty boost bay 204. The jumper 206 couples the cells 104 to the positive terminal of the battery system (shown as "+" and labeled 300 V) in the absence of the boost battery pack. The cells 104 are also connected to the negative terminal of the battery system (shown as "−" and labeled 0 V). The arrangement of cells 104 is shown as a series connection in the embodiment of FIG. 2. With the jumper 206 in place, the motor controller 106 receives the same voltage and current from the base battery pack 208 in FIG. 2 as would the motor controller 106 receive from the non-boostable battery pack 112 of FIG. 1. In some embodiments, the positive and negative terminals are provided by the container 202, and the base battery pack 208 is coupled to the positive and negative terminals by a configurable coupling.

Figure 3:
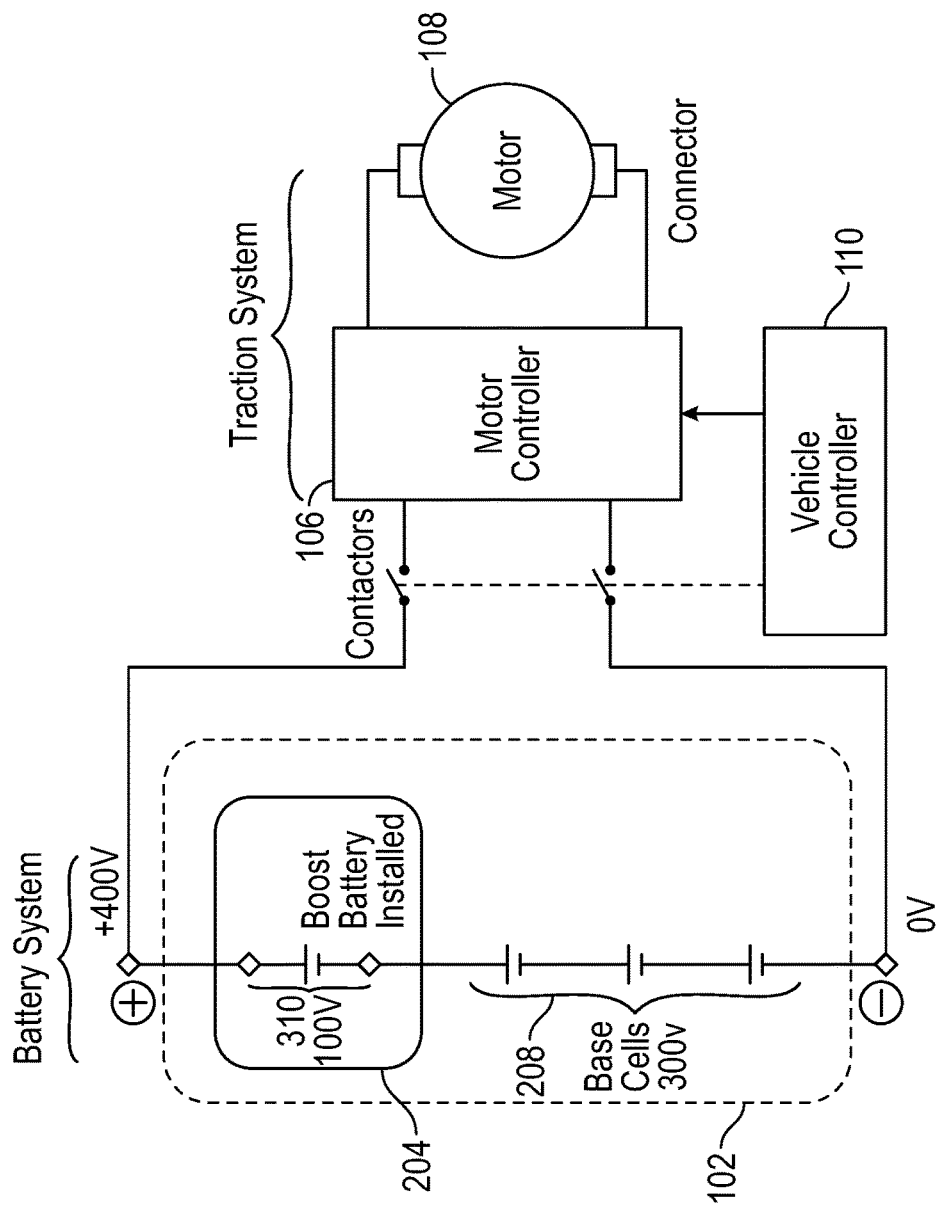
FIG. 3 is a schematic diagram of the battery system of FIG. 2, with a boost battery pack installed in accordance with some embodiments of the invention.

FIG. 3 shows the battery system of FIG. 2, with a boost battery pack 310 installed in the boost bay 204. The container 102 holds both the base battery pack 208 and the boost battery pack 310. In the embodiment shown, the jumper 206 is removed and the boost battery pack 310 is installed in place of the jumper 206. Thus, the jumper 206 is removed in cooperation with installation of the boost battery pack 310. With the boost battery pack 310 in place, in series with the base battery pack 208, the motor controller 106 receives the series voltage of the boost battery pack 310 and the base battery pack 208. In this example, this voltage is 300 volts from the base battery pack 208, plus 100 volts from the boost battery pack 310. With the boost battery pack 310 in series with the base battery pack 208, the motor controller 106 receives electric current totaling a number of amp-hours over the discharge cycle of the combined boost battery pack 310 and base battery pack 208. This number of amp-hours is generally the lesser of the amp-hour capacity of the base battery pack 208 and the amp-hour capacity of the boost battery pack 310. In order to restore range, the boost battery pack 310 could have a capacity that is about the same as, i.e., matched to, the amp-hour capacity of a degraded base battery pack 208. In order to add performance, the boost battery pack 310 could have a capacity that is substantially equivalent to the amp-hour capacity of a new base battery pack 208. Accordingly, boost battery packs 310 could be sold with a range of capacities to accommodate different ranges.

Still referring to FIG. 3, adding the boost battery pack 310 in series with the base battery pack 208 lowers the current that is delivered to the motor controller 106 for a given power level, as compared to the base battery pack 208. In other words, the voltage of the series-connected boost battery pack 310 and base battery pack 208 is greater than the voltage of the base battery pack 208 alone thereby lowering the current. Power, which may be measured in watts, is the product of voltage and current. To deliver a given power level of watts (more specifically, kilowatts for an electric or hybrid vehicle) at the higher voltage, a lower current is required. This lower current may help extend the life of the degraded base battery pack 208. Also, this lower current level is delivered over a longer number of hours, determined by the amp-hour capacity of the base battery pack 208, than would be the case if the higher current level were delivered. Thus, adding the boost battery pack 310 allows the base battery pack 208 to deliver lower current for a longer number of hours, extending the mile range of the electric or hybrid vehicle. The boost battery pack 310 delivers the same current as the base battery pack 208, for the same longer number of hours, such that the total amount of watt-hours or total amount of energy delivered by the combined base battery pack 208 and boost battery pack 310 is greater than or equal to the total amount of watt-hours or total amount of energy originally delivered by a new base battery pack 208, in some embodiments. The total amount of watt-hours or total amount of energy delivered by the combined base battery pack 208 and boost battery pack 310 is dependent upon the voltage, current, amp-hours capacity and watt-hours capacity of each of these components. Generally, whichever battery pack (i.e., the base battery pack or the boost battery pack) has a lower amp-hours capacity will be the limiting component in the combination. Although the base battery pack 208 and the boost battery pack 310 are depicted as having a small number of cells in series (in the base battery pack) or a single cell (in the boost battery pack), each pack could have a single cell or various combinations and numbers of cells in series, or in parallel, or in series and parallel, as readily devised.

In some embodiments of FIG. 3, the motor controller 106 senses voltage of the base battery pack 208 and/or the voltage of the boost battery pack 310, or the series voltage of the two combined. The motor controller 106 can then adjust or compensate for steady performance of the electric or hybrid vehicle over the lifespan of the battery system. For example, the motor controller could limit the maximum power delivered to the electric motor 108, i.e., the maximum number of instantaneous kilowatts, to a predetermined amount over most of the discharge cycle of the battery system, or could adjust this maximum power number for selectable mile or kilometer ranges.

FIG. 4 shows various locations for a boost battery pack, in a container 402. The container 402 has a boost bay, which could be in various locations and could be various sizes, some of which are shown in the example. The container 402 thus initially holds the base battery pack, without a boost battery pack in some embodiments. Later, when the boost battery pack is added, the container 402 holds both the base battery pack and the boost battery pack. The container 402 and the boost bay can be designed with weight balance in mind. For example, weight distribution of the boost battery pack and the base battery pack can be balanced to approximately match the weight distribution of the base battery pack without the boost battery pack. It should be appreciated that this balancing could be relative to the container 402, or relative to the electric or hybrid vehicle as a whole. In some embodiments, the boost bay 414 and the boost battery pack, when installed, are located at a center of gravity 406 of the container 402, which would be approximately at the geometric center of the container 402. This location could be used when the vehicle has the container 402 mounted approximately at the center of gravity of the vehicle, with the length of the container 402 running in the fore and aft direction relative to the vehicle. This location could also be used when the vehicle has the container 402 mounted laterally with respect to the vehicle, e.g., a transverse mounting on the underside of the vehicle, so that adding a boost battery pack in the geometric center of the container 402 preserves lateral balance of the vehicle.

In some embodiments of FIG. 4, the boost bay 410, 412 is located forward of the center of gravity 406 of the container 402, at a center of gravity 404 of the vehicle. This could occur when the vehicle is generally front heavy, and the container 402 with a base battery pack is located shifted rearward of the geometric center of the vehicle, for weight balance. Adding a boost battery pack at the center of gravity 404 of the vehicle entails adding a boost battery pack forward of the geometric center of the container 402, resulting in the forward placement of the boost bay 410, 412 in the container 402. A smaller boost bay 410 could accommodate a smaller boost battery pack. A larger boost bay 412 could accommodate a larger boost battery pack. Or, the larger boost bay 412 could accommodate either a smaller or larger boost battery pack, with appropriate fittings as readily devised. In an alternative embodiment, for a vehicle that is generally tail heavy, the container 402 with a base battery pack could be located shifted forward of the geometric center of the vehicle, for weight balance. In this embodiment, the boost battery pack could be added at a center of gravity 408 of the vehicle, which would be a rearward placement of the boost bay 416 relative to the geometric center of the container 402.

The container 402 could be made of metal or plastic or other suitable material, and have air cooling or liquid cooling, for example. In some embodiments, the container 402 is formed integrally with the chassis or other portion of the vehicle. In other embodiments, the container 402 is formed separately and installed in the vehicle. The boost bay could include one or more compartments of the container 402, or could be an available empty space in the container 402. The boost bay is dimensioned to hold the boost battery pack in the container 402, and could be dimensioned to receive various sizes of boost battery packs. For example, the boost bay could be dimensioned to receive a small, a medium or a large battery pack, or two small or medium battery packs, and so on, allowing for flexibility of choice of upgrades. In various embodiments, the boost bay is with or without walls, and with or without a lid. A hatch or other lid could be sealed to the boost bay or to the entire container 402 with a gasket. The boost bay is formed by the arrangement of cells of the base battery pack, in one embodiment. In one embodiment, the container and the base battery pack are field upgradable by the addition of the boost battery pack. That is, the boost battery pack can be added to the container and coupled to the base battery pack, at a service station or repair center, without requiring a technician to dismantle the base battery pack.

FIG. 5 shows electrically how the boost battery pack can be connected to the base battery pack, in various series couplings as embodiments. In one embodiment, the boost battery pack 502 is coupled in series with a base battery pack with the positive terminal of a cell 104 of the boost battery pack 502 coupled to the positive terminal of the battery system. In another embodiment, the boost battery pack 504 is coupled in series with cells of a base battery pack, with a cell 104 of the boost battery pack 502 being in between other cells 104 of the base battery pack. In yet another embodiment, the boost battery pack 506 is coupled in series with the base battery pack, with the negative terminal of a cell 104 of the boost battery pack 506 coupled to the negative terminal of the battery system. Such couplings can be arranged with the use of one or more jumpers, such as the jumper 206 shown in FIG. 2, or other couplings as readily devised. In various embodiments, a configurable coupling includes terminals, relays, jumpers, connectors and/or wiring that support addition of the boost battery pack to the base battery pack. The configurable coupling provides electric power from the base battery pack alone or from the base battery pack in combination with the boost battery pack. In some embodiments, the configurable coupling is operable to couple to the boost bay, in order to couple to a boost battery pack installed in the boost bay.

Also in FIG. 5, a battery management system 508 is shown. In various embodiments, the battery management system 508 could include temperature sensors, voltage sensors, current sensors and/or other sensors which could be attached to or distributed among the cells in the various battery packs. In one embodiment, the battery management system 508 monitors the base battery pack, and is configurable to further monitor a boost battery pack when installed. Such a battery management system 508 could manage charging and discharging of the base battery pack, and manage charging and discharging of the base battery pack and the boost battery pack together. In another embodiment, the battery management system 508 has a subsystem for the cells of the base battery pack. The boost battery pack includes another subsystem of the battery management system 508. When the boost battery pack is installed in the container, the boost battery pack subsystem is then coupled to the base battery pack subsystem. In one embodiment, the base battery pack has a first battery management system, the boost battery pack has a second battery management system, and the two systems can communicate with each other. In other words, the battery management system 508 could be modular, integral, expandable, or fixed, in various embodiments. Some embodiments of the battery management system 508 include connectors so that additional sensors or subsystems can be coupled in. The battery management system 508 could be integral with battery pack cooling, or could monitor such cooling. Battery pack cooling could be based on airflow or liquid flow, and could be modular, integral, expandable, or fixed, in various embodiments. The battery pack management system 508 may be configured as described with reference to U.S. application Ser. No. 13/794,535, which is hereby incorporated by reference for all purposes.

FIG. 6 shows electrically how the boost battery pack can be connected to the base battery pack, in parallel couplings as embodiments. In the embodiment shown, a cell 104 of the boost battery pack 602 is coupled in parallel to a cell 104 of the base battery pack. In further embodiments, the boost battery pack 602 has multiple cells in series or in combinations of series and parallel configurations, and this group of cells is connected in parallel to the group of cells forming the base battery pack. In the embodiment shown, the positive terminal of the boost battery pack is coupled to the positive terminal of the battery system, and the negative terminal of the boost battery pack is coupled to the negative terminal of the battery system. The positive terminal of the base battery pack is coupled to the positive terminal of the battery system, and the negative terminal of the base battery pack is coupled to the negative terminal of the battery system.

Figure 7:
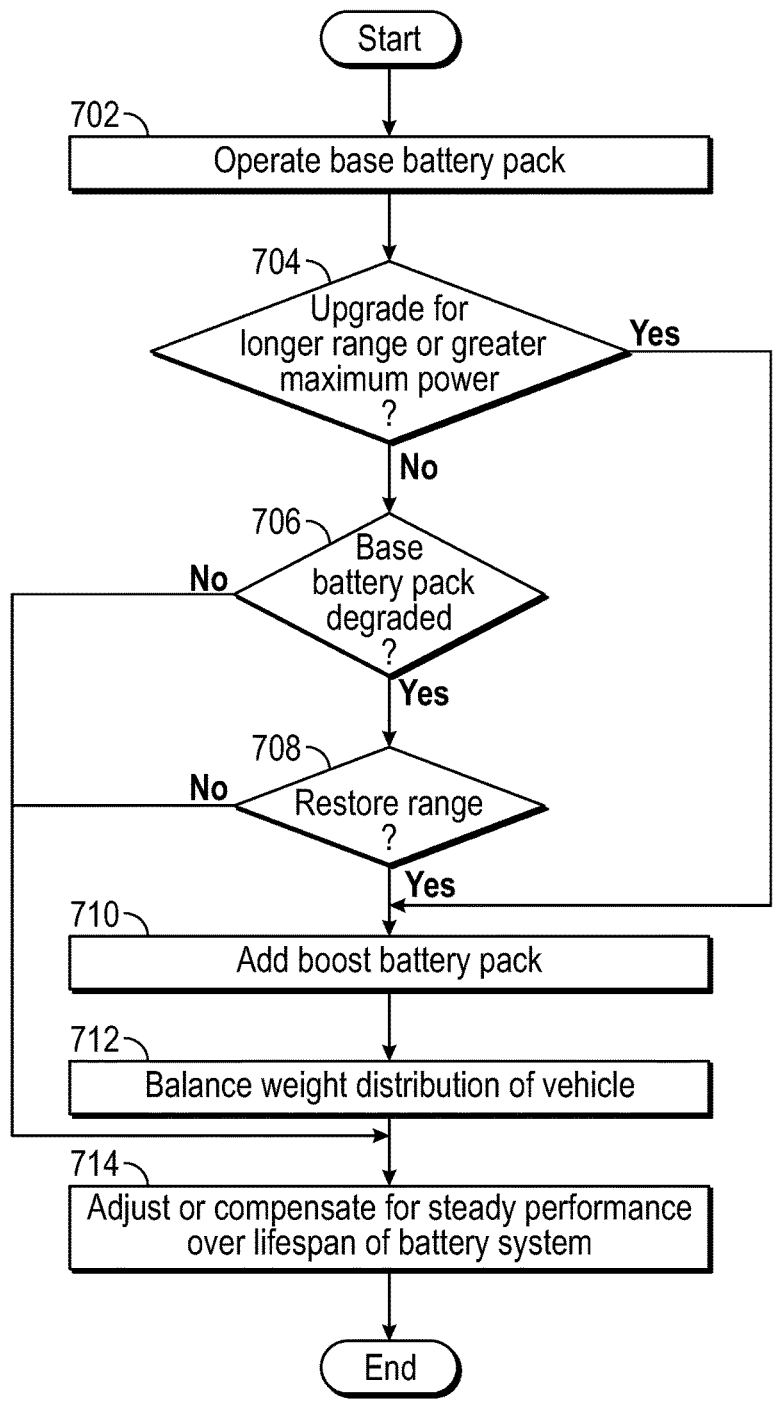
FIG. 7 is a flow diagram of a method of operating a battery system in accordance with some embodiments of the invention.

FIG. 7 shows a method of operating a battery system. In various embodiments of the method, these steps can be rearranged, steps can be deleted, and/or steps can be added. The method can be practiced on embodiments of the battery systems shown in FIGS. 2-6. In one action 702 of the method, the base battery pack is operated. This could be the base battery pack of FIG. 2, with the motor controller shaping electrical power from the battery system to the electric motor in a hybrid or electric vehicle. The electrical power provided from the base battery pack to the electric or hybrid vehicle could be sufficient to propel the electric or hybrid vehicle to a specified distance or range of distances.

In a decision action 704, it is determined whether the battery system should be upgraded, e.g., for longer range or greater maximum power. The owner of an electric vehicle may desire a longer range or a greater amount of maximum power, and arrange for an upgrade. If it is determined that the system should be upgraded, the flow branches to the action 710. If it is determined that there should not be an upgrade, the flow branches to the decision action 706.

In the decision action 706, it is determined that the base battery pack degraded. For example, after a number of years of operation with many cycles of discharge and charge, the amp-hour capacity of the base battery pack could be down by 20% or more from the amp-hour capacity of a new base battery pack. In some embodiments, the degradation can cause the distance range to drop below a threshold value where the distance range becomes an issue for the vehicle operator. If it is determined that the base battery pack is not degraded, flow continues to the action 714. If it is determined that the base battery pack is degraded, flow proceeds to the decision action 708. In the decision action 708, it is determined if the range should be restored. For example, the owner of an electric vehicle may need or desire the original distance range of the vehicle, and decide the range should be restored. In a further embodiment, it may be determined if the capacity of the battery system should be restored. If the range (or capacity) should be restored, flow proceeds to the action 710. If the range or (or capacity) should not be restored, flow proceeds to the action 714.

In the action 710, a boost battery pack is added. For example, the boost battery pack could be added to the base battery pack, as shown in FIG. 3. The boost battery pack could be added by installing the boost battery pack in a boost bay of the container as shown in FIG. 3, or as shown in various embodiments in FIGS. 4-6. Electrical power provided from the base battery pack and the boost battery pack combined could be sufficient to propel the electric or hybrid vehicle to another specified distance range, i.e., a second distance range. This second distance range could be equal to the original first distance range, in the case where the first distance range degraded and it is desired to restore the first distance range. Also, the specified distance range could be equal to the original first distance range, in a case where the user desires a greater amount of maximum power to be delivered during a discharge cycle as compared to the maximum electric power that was available with the original base battery pack. Alternatively, the specified distance range could be greater than the original specified distance range, in the case where an upgrade of distance range and capacity of the battery system is desired.

Flow proceeds to the action 712 of FIG. 7, where the weight distribution of the vehicle is balanced. This could be accomplished by installing the boost battery pack at a center of gravity of the container or at a center of gravity of the vehicle, as shown in FIG. 4. In the action 714, the system adjusts or compensates for steady performance over the lifespan of the battery system. For example, the motor controller could coordinate with the vehicle controller and regulate the maximum power delivered to the motor from the battery system. The motor controller could take into account the voltage of the base battery pack, the voltage of the combined base battery pack and boost battery pack, and other factors such as characteristics of cells, lookup table data, switch settings, software settings, battery and/or electric motor configurations etc. Flow could then go to an endpoint, or loop back to various entry or reentry points.

Embodiments of the battery system and related method offer advantages over fixed, non-upgradable battery systems. The boost battery pack may provide a low-cost way to restore battery system capacity lost due to battery aging effects. The battery system may lower initial system cost by not requiring oversizing of the base battery pack. In comparison, a fixed, non-upgradable battery system generally has a capacity sized so that even the capacity of an aged system still satisfies a large percentage of users, e.g., as to range of an electric vehicle. The battery system described herein may lower initial system cost to users that do not require extra range. The battery system may also provide an alternative to complete pack replacement for those users requiring extra range. The addition of the boost pack may reduce the rate of aging on the base pack because, after the installation of the boost pack, the base pack becomes exposed to smaller operating currents. Some percentage of vehicles may not require a boost pack because these vehicles could be taken out of service before the boost pack would be required. Additional cost savings may occur if future cost of cells is less expensive than the present cost of cells. The battery system described herein may offer a manufacturer a path to reduced warranty costs. The manufacturer could choose to guarantee a range-based battery pack life, and provide a boost battery pack as a warranty service rather than replacing an entire base battery pack. In some embodiments, the boost pack could be rented when the vehicle owner wants to go on a trip. Upon completion of the trip, the vehicle owner can return the rented boost battery pack or remove the boost battery pack and store it for a future trip. In these embodiments, the boost battery pack is used when needed and then the boost battery pack can be removed from the vehicle and stored/recharged for a later installation and use.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A battery system, comprising:
a base battery pack;
a container having the base battery pack therein, the container configured to receive a boost battery pack, wherein the container can hold the base battery pack and the boost battery pack;
a coupling operable to provide electric power from the base battery pack alone or from the base battery pack in combination with the boost battery pack, wherein the container and the base battery pack are configured to be field upgradable by addition of the boost battery pack; and
a battery management system configured to provide a first electrical power from the base battery pack to an electric or hybrid vehicle, the first electrical power sufficient to propel the electric or hybrid vehicle to a first distance range, the battery management system configured to detect degradation of the base battery pack causing the first distance range to drop below a threshold value, and the battery management system configured to provide a second electrical power from the base battery pack and the boost battery pack to the electric or hybrid vehicle, the second electrical power sufficient to propel the electric or hybrid vehicle to a second distance range that is greater than the threshold value.

2. The battery system of claim 1, further comprising:
the boost battery pack, installed in the container and coupled to the base battery pack.

3. The battery system of claim 1, further comprising:
a boost bay housed within the container, the boost bay dimensioned to hold the boost battery pack in the container, wherein the coupling is operable to couple to the boost bay.

4. The battery system of claim 1, wherein the coupling is operable to couple the base battery pack and the boost battery pack in one of a series combination or a parallel combination.

5. The battery system of claim 1, wherein an amp-hour capacity of the boost battery pack is approximately matched to an amp-hour capacity of the base battery pack prior to any degradation of the base battery pack.

6. The battery system of claim 1, wherein an amp-hour capacity of the boost battery pack is approximately matched to an amp-hour capacity of the base battery pack in a degraded condition.

7. The battery system of claim 1, further comprising:
the boost battery pack; wherein:
the base battery pack has a first battery management system;
the boost battery pack has a second battery management system; and
the first battery management system and the second battery management system are operable to communicate with each other.

8. The battery system of claim 1, further comprising:
a battery management system, operable to manage charging and discharging of the base battery pack alone and operable to manage charging and discharging of the base battery pack and the boost battery pack together.

9. A battery system for use in an electric or hybrid vehicle, the battery system comprising:
a container having a negative terminal and a positive terminal;
a base battery pack in the container;
the container and the base battery pack dimensioned to receive a boost battery pack;
a configurable coupling operable to couple the base battery pack to the negative terminal and the positive terminal, the configurable coupling further operable to couple the boost battery pack and the base battery pack in combination to the negative terminal and the positive terminal, wherein the container and the base battery pack are configured to be field upgradable by addition of the boost battery pack; and
a battery management system configured to provide a first electrical power from the base battery pack to an electric or hybrid vehicle, the first electrical power sufficient to propel the electric or hybrid vehicle to a first distance range, the battery management system configured to detect degradation of the base battery pack causing the first distance range to drop below a threshold value, and the battery management system configured to provide a second electrical power from the base battery pack and the boost battery pack to the electric or hybrid vehicle, the second electrical power sufficient to propel the electric or hybrid vehicle to a second distance range that is greater than the threshold value.

10. The battery system of claim 9, wherein:
the configurable coupling includes a jumper operable to couple the base battery pack to the positive terminal or the negative terminal; and
the jumper is removable from the base battery pack in cooperation with installation of the boost battery pack.

11. The battery system of claim 9, wherein the base battery pack and the container are arranged so that addition of the boost battery pack to the base battery pack and the container achieves approximately a same weight distribution as the base battery pack and the container.

12. The battery system of claim 9, wherein the container and the base battery pack dimensioned to receive the boost battery pack includes the container having a boost bay, the boost bay dimensioned to receive a plurality of sizes of boost battery packs.

13. A method of operating a battery system, comprising:
providing a first electrical power from a base battery pack to an electric or hybrid vehicle, the first electrical power sufficient to propel the electric or hybrid vehicle to a first distance range;
detecting a degradation of the base battery pack, the degradation causing the first distance range to drop below a threshold value;
adding a boost battery pack to the base battery pack responsive to the detecting; and
providing a second electrical power from the base battery pack and the boost battery pack to the electric or hybrid vehicle, the second electrical power sufficient to propel the electric or hybrid vehicle to a second distance range that is greater than the threshold value.

14. The method of claim 13, further comprising:
managing the charging and the discharging of the boost battery pack and the base battery pack with a single battery management system.

15. The method of claim 13, further comprising:
managing the charging and the discharging of the base battery pack with a first battery management system and the boost battery pack with a second battery management system, wherein the first battery management system communicates with the second battery management system.

16. The method of claim 13, wherein:
the second distance range is approximately equal to the first distance range; and
the second electrical power provides a greater amount of maximum power to the electric or hybrid vehicle during a discharge cycle than does the first electrical power.

17. The method of claim 13, wherein a motor controller of the electric or hybrid vehicle has sufficient voltage margin to operate with a voltage of the base battery pack alone and to operate with a voltage of the base battery pack in series with the boost battery pack.

18. The method of claim 13, further comprising:
adjusting for steady performance of the electric or hybrid vehicle over a lifespan of the base battery pack in combination with the boost battery pack.

19. The method of claim 13, further comprising: balancing weight distribution of the boost battery pack and the base battery pack to an approximate match of a weight distribution of the base battery pack without the boost battery pack, relative to the electric or hybrid vehicle.

* * * * *